United States Patent [19]
Connor

[11] 3,874,108
[45] Apr. 1, 1975

[54] DEVICE FOR DETERMINING THE DEPTH OF A TROLLING PLUG

[76] Inventor: Loly V. Connor, 2018 Breazeale Dr., Anderson, S.C. 29621

[22] Filed: May 13, 1974

[21] Appl. No.: 469,301

[52] U.S. Cl. .................................. 43/25, 33/126
[51] Int. Cl. ........................................... A01k 87/02
[58] Field of Search ........ 43/25; 33/126, 169 B, 138

[56] References Cited
UNITED STATES PATENTS

| | | | |
|---|---|---|---|
| 2,752,686 | 7/1956 | Anderson et al. | 43/25 |
| 3,149,419 | 9/1964 | Koznarski | 33/126 |

*Primary Examiner*—Louis G. Mancene
*Assistant Examiner*—Peter K. Skiff
*Attorney, Agent, or Firm*—Bailey & Dority

[57] ABSTRACT

A device for mounting on the end of a fishing rod for aiding in determining the depth that a fishing plug is running while trolling from a moving boat. The device includes a housing having a freely rotatable transverse shaft carried thereby. A radially extending arm is carried by the transverse shaft and has an eyelet adjacent one end for engaging the line upon which the fishing plug is attached. A weighted pivotal cylinder having a calibrated scale thereon is carried by the housing for indicating the angular position of the line relative to a horizontal plane. A pointer is operably connected to the radially extending arm for indicating the angular position of the line. Also mounted on the rod is a device for measuring the length of the line between the rod and the plug. By taking an angular reading of the line, as well as knowing the length of the line, reference can be made to a chart for determining the exact depth of the plug.

5 Claims, 6 Drawing Figures

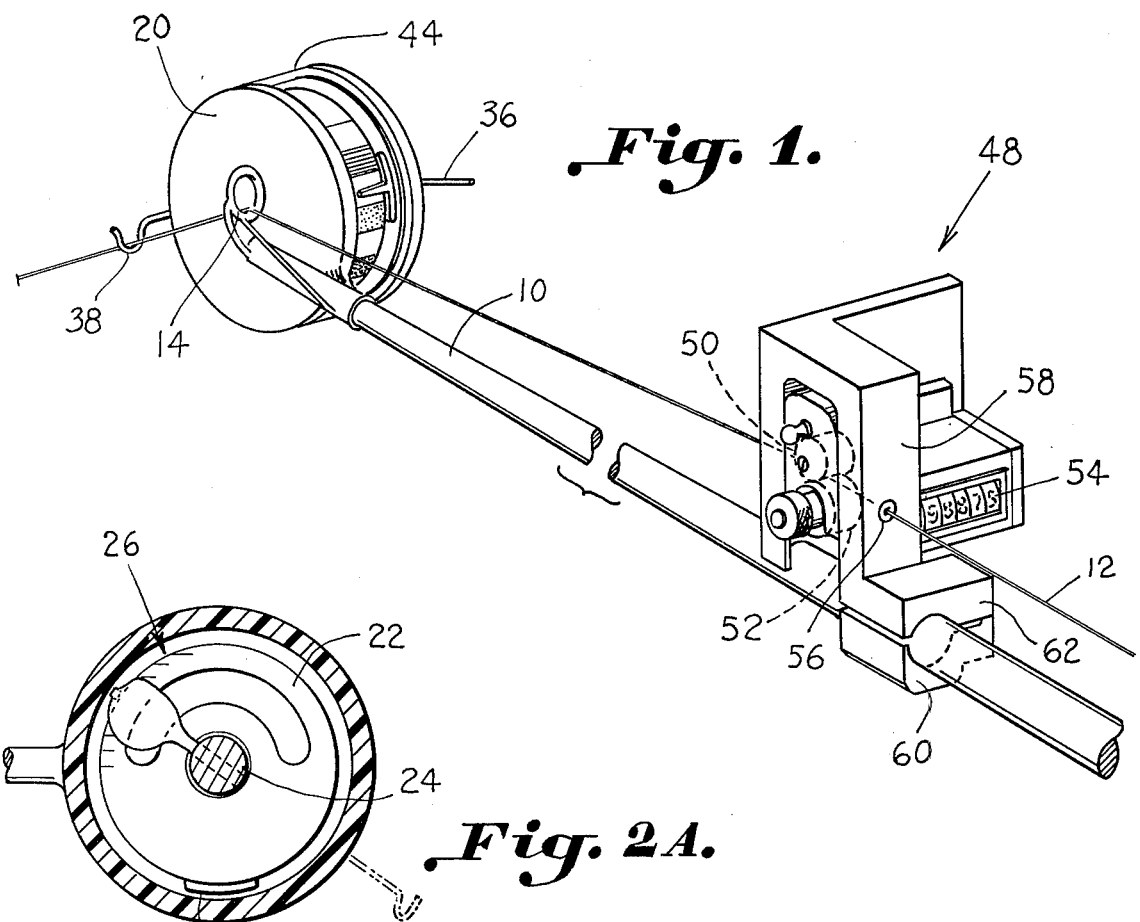
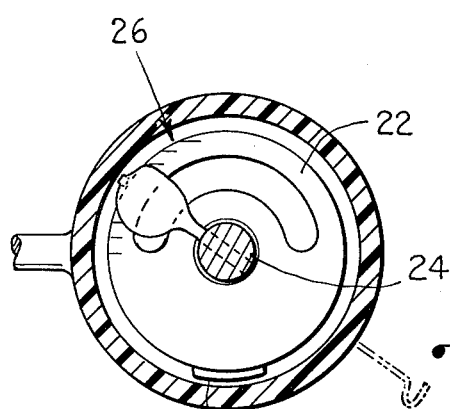
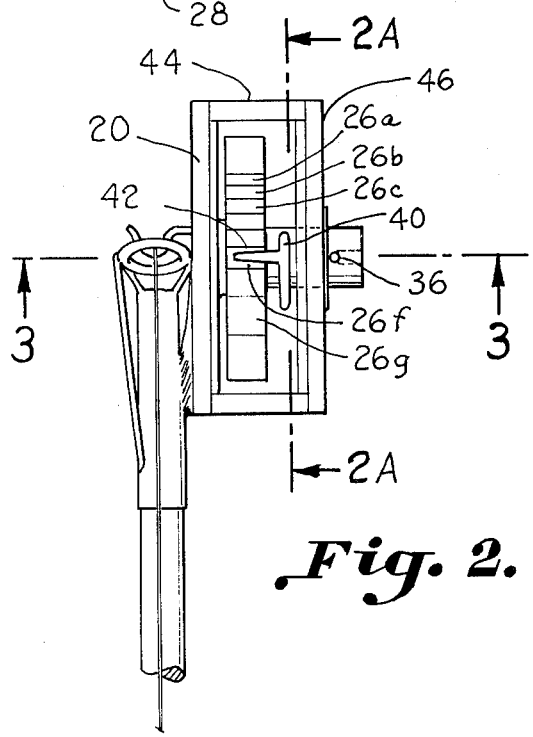
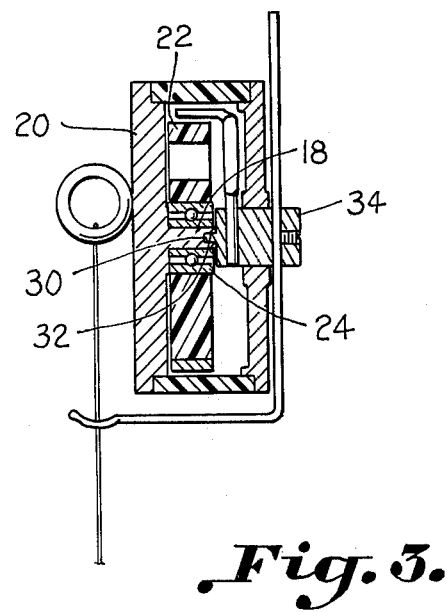
Fig. 1.
Fig. 2A.
Fig. 2.
Fig. 3.

CURVED LINES = LENGTH OF LINE

DEVICE FOR DETERMINING THE DEPTH OF A TROLLING PLUG

BACKGROUND OF THE INVENTION

This invention relates generally to a fishing apparatus and more particularly to a device for aiding in measuring the depth that a plug is being trolled behind a boat.

Most fishermen are fully aware that schools of fish tend to congregate in layers of water which would vary according to the temperature of the water. From experience it has been found that during certain times of year or when the water temperature is of a particular degree, the probability that the fish will be at a certain depth is much greater. As a result, the more experienced fisherman desires to know exactly the depth that the plug is running while trolling. In many instances a difference of merely a few feet will greatly affect the amount of fish caught.

Devices for determining the depth of shallows and holes in lake bottoms are known, and one such example is illustrated in U.S. Pat. No. 2,669,785. There is also a teaching therein of mounting such a device on the end of a fishing rod; however, such would be extremely cumbersome to use while trolling.

SUMMARY OF THE INVENTION

The invention includes an apparatus for mounting on the end of a fishing rod for aiding in determining the depth that a fishing plug which is attached by a line is running while trolling from a moving boat. The apparatus includes a housing mounted on the end of a fishing rod. A freely rotatable transverse shaft is carried by the housing and a radially extending arm extends outwardly therefrom. An eyelet is carried on one end of the radially extending arm through which the line extends for causing the radially extending arm to assume the same angular position relative to a horizontal plane as the line.

A weighted pivotal member is carried by the housing and has a calibrated scale thereon that is maintained in substantially the same position regardless of the angular position of the rod. A pointer is operably connected to the radially extending arm and is carried adjacent the calibrated scale for indicating the angular position of the line relative to the horizontal plane. Also positioned on the rod is a device for measuring the length of the line between the rod and the plug. Thus, the depth that the plug is running behind the boat can be determined by utilizing a chart and the angular reading for a given length line.

Accordingly, it is the general object of the present invention to provide an attachment for a fishing rod for indicating the depth that a plug is running while being trolled behind a moving boat.

Another important object of the present invention is to provide an apparatus for indicating the length, as well as the angle that a line is extending from a rod for aiding in determining the depth that a plug carried thereon is running while being trolled.

Still another important object of the present invention is to provide an apparatus that can be attached to the end of the rod for measuring the angle that a line extends from the rod regardless of the angle that the rod is being held.

These and other objects and advantages of the invention will become apparent upon reference to the following specification, attendant claims and drawings.

BRIEF DESCRIPTION OF THE DRAWINGS

FIG. 1 is a perspective view illustrating an apparatus carried on the end of the fishing rod for determining the depth that a plug is being pulled while trolling, FIG. 2 is an enlarged plan view of the device for measuring the angle of the line extending from the rod, FIG. 2a is a sectional view taken along line 2a—2a of FIG. 2, FIG. 3 is a sectional view taken along line 3—3 of FIG. 2.

DESCRIPTION OF A PREFERRED EMBODIMENT

Figure 4:
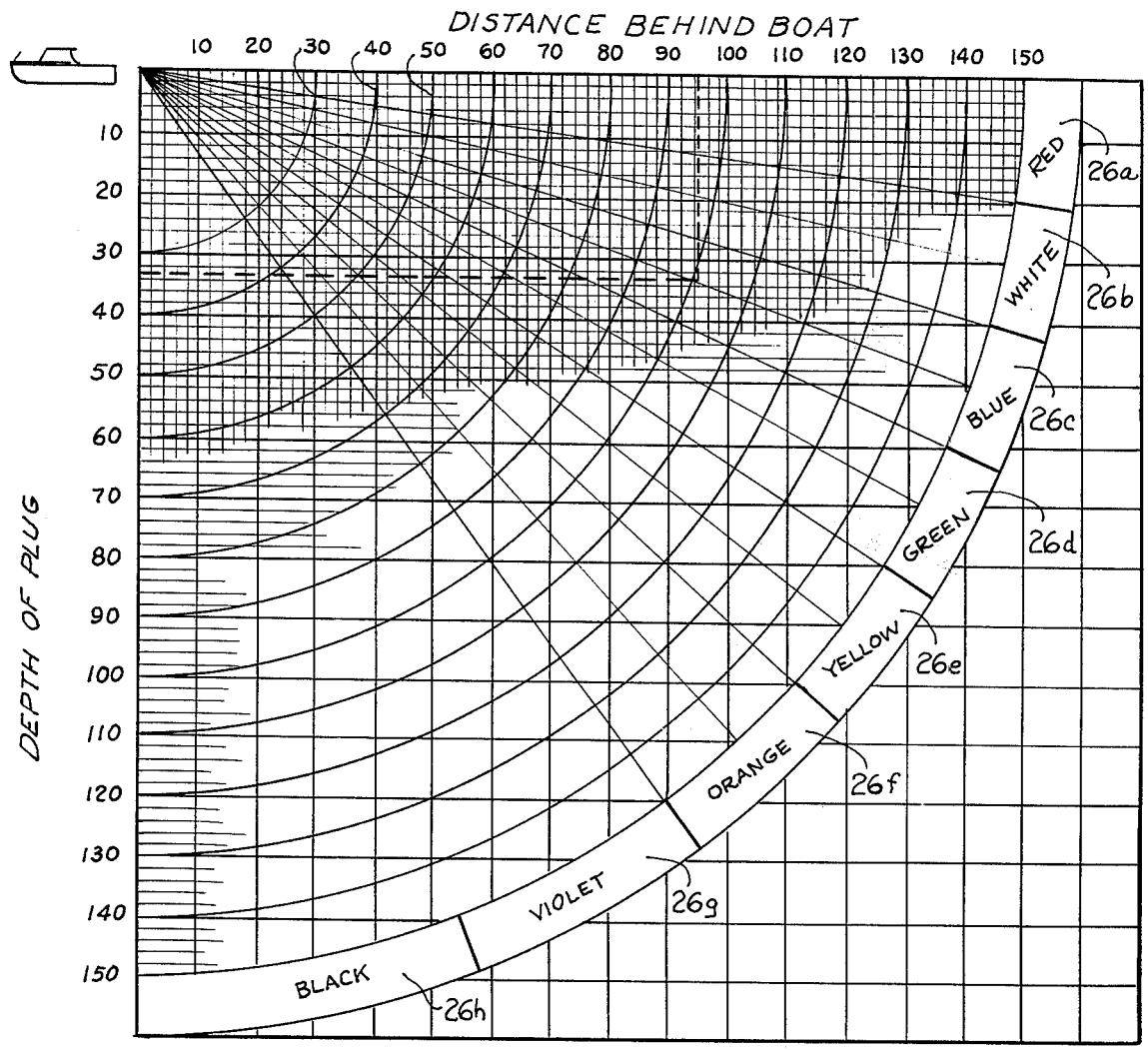
FIG. 4 is a chart calibrated for aiding in determining the depth that a lure is running behind a boat.

Referring in more detail to FIG. 1 of the drawings, there is illustrated an end portion of a conventional rod 10 wherein a line 12 extends the length thereof and passes through an eye 14 carried on the end. Attached to the eye 14 by welding or any other suitable means is a circular housing 16 that has a centrally located pin 18 extending horizontally from a side wall 20 of the housing 16. A cylindrical cylinder 22 is carried on the horizontal post 18 with a ball bearing 24 interposed between the post 18 and the cylinder so as to permit such to rotate freely. The cylinder 22 has a color coded calibrated scale 26 painted on the periphery thereof corresponding to angular deflection of the line 12. The cylinder 22 is weighted adjacent the bottom by a lead weight 28 so as to maintain the calibrated scale 26 in the same vertical position regardless of the angular position of the rod 10.

The outer end of the post 18 has a bore 30 for receiving a pin 32 carried on the inner end of a cylinder 34. The cylinder 34 is permitted to rotate freely within the bearing 18 on the pin 32. The cylinder 34 extends laterally outwardly from the calibrated cylinder 22 and has a transverse hole provided therein through which a radially extending arm 36 extends. A set screw 37 is utilized to hold the arm 36 in position. On the outer end of the arm 36 is an eye 38 through which the line passes.

Also, extending radially outwardly from the cylinder 34 is a weighted pointer 40. The pointer 40 has a laterally extending portion 42 which extends over the calibrated scale on the calibrated wheel 22. The reason that the pointer is weighted is to tend to rotate the cylinder 34 counter clockwise so that the eye 38 on the end of the arm 36 will bear against the line 12 at all times.

In order to readily observe the calibrated scale 26 on the cylinder 22, a transparent cylinder 44 extends outwardly from the side wall 20 of the housing and encompasses the calibrated cylinder 22. A cover plate 46 is carried on the opposite side of the transparent cylinder 44 from the side panel 20 and is secured thereto by any suitable means such as gluing.

In order to measure the length of the line, a calibrated counter generally designated by the reference character 48 is utilized. The line 12 passes between a pair of rollers 50 and 52 which are suitably mounted within a housing. The line passing over the roller 52 rotates the roller causing the rotations thereof to be registered on a dial 54. An eyelet 56 is provided in a vertical wall 58 of the housing for permitting the line 12 to pass therethrough between the rollers 50 and 52.

A similar eyelet is carried on the back side of the counter 48. The entire counter is mounted by screws extending between a lower bracket portion 60 upwardly into a main body portion 62 of the counter. Such is not disclosed for purposes of clarity. The counter 48 is calibrated so that when the lure is positioned adjacent the eyelet 14 on the end of the rod 10, the dial 54 registers zero. As the line is let out such causes the rollers 50 and 52 to rotate registering the number of feet passing therethrough. The angle that the line 12 makes with the horizontal plane is registered by the pointer 42 on a color coded calibrated scale 26 provided on cylinder 22.

As previously mentioned, as the line 12 passes through the eyelet 38, it causes the arm 36 to pivot, rotating the cylinder 34. As the cylinder 34 is rotated, the pointer 42 extending outwardly therefrom is positioned adjacent the appropriate color coded angular representation on the cylinder 22.

The fisherman then refers to a chart that has been previously calculated such as illustrated in FIG. 4 and by knowing the angle that the line 12 is extending out as represented by a colored segment on the cylinder 22 and referring to the same colored segment on the chart of FIG. 4 and the length of the line extending outwardly from the rod, the exact depth that the plug is running can be determined. For example, if the scale 54 of the counter 48 registered that a hundred feet of line had been reeled out and the pointer 42 as observed by the fisherman was registering in a blue calibrated segment such as represented by the segment 26f, he would then make reference to the chart such as illustrated in FIG. 4. As seen the curved lines extending from the left hand uppper corner of the graph outwardly represents segments of ten feet. Readings directly across the top of the chart represent the distance that the plug is behind the boat and the readings down the left hand side of the chart represent in segments of ten feet the depth that the plug is behind the boat.

Where the curve line representing a hundred feet crosses a line drawn from the center of the blue segment and the upper left hand corner of the chart such if read to the left would indicate that the plug is running 34 feet deep and if read vertically would be 94 horizontal feet behind the boat.

The curve illustrated in FIG. 4 has been computed to give an instant reading where the angle of the line and the length of the line extending outwardly from the rod can be determined. Of course, other suitable curves could be utilized for giving an instantaneous reading.

Figure 5:
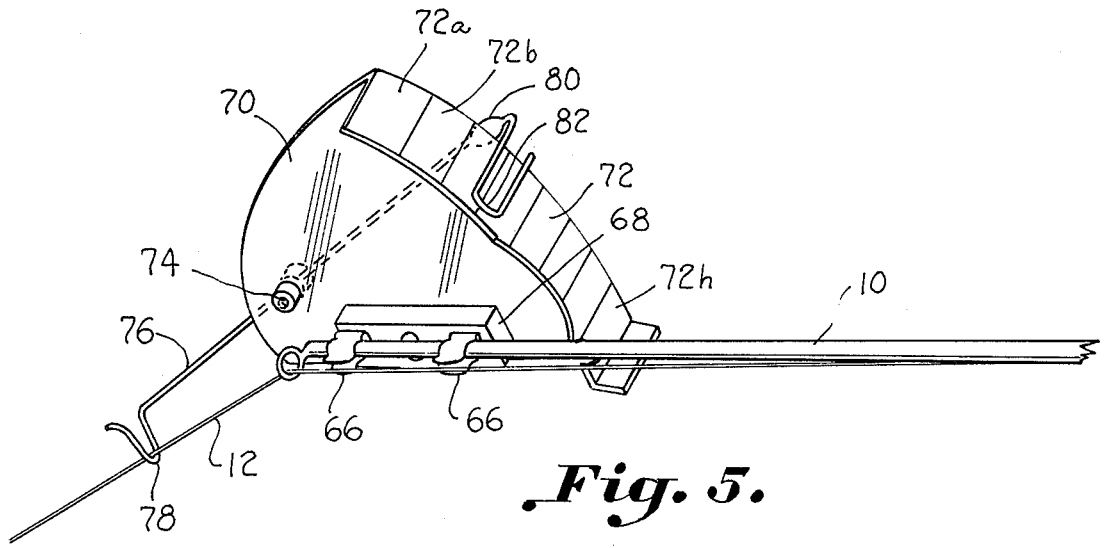
FIG. 5 is a perspective view illustrating a modified form of the invention.

FIG. 5 illustrates a modified form of the invention wherein the device is adapted to be snapped on to the rod 10. It is essential that the rod be held in a horizontal plane so as to determine the correct angle between the line 12 and a horizontal plane.

The apparatus includes a pair of spring clips 66 suitably carried on a block 68 which are adapted to snap onto the end of the rod 10. The block 68 is in turn secured to a side wall 70 of a housing. The side wall 70 has an inwardly turned flange 72 which is arcuate in shape and divided into calibrated segments 72a through 72h. The segments 72a through 72h are calibrated in the same manner as the segments 26a through 26g of the device shown in FIG. 2 and correspond to angular displacement. A post 74 extends laterally from the side plate 70 for pivotally receiving an arm 76. The arm 76 has a circular portion which extends around the post 74 for permitting such to pivot freely therearound. An eye 78 is provided on the outer end of the arm 76 through which line 12 passes. Integral with an upper end of the arm 76 is a weight 80 which tends to force the arm 76 clockwise so as to maintain the eye 78 in engagement with the line 12. An inwardly turned pointer 82 is integral with the upper end of the arm 76 for indicating the corresponding color coded segment that represents the angular position of the line 12 relative to the rod 10. Any suitable device such as the counter shown in FIG. 1 may be utilized with the device of FIG. 5 for measuring the length of the line so that the chart of FIG. 4 can be used to calibrate the exact depth the plug carried on the end of the line is running behind the boat.

While a preferred embodiment of the invention has been described using specific terms, such description is for illustrative purposes only, and it is to be understood that changes and variations may be made without departing from the spirit or scope of the following claims.

What is claimed is:

1. An apparatus for mounting on the end of a fishing rod for aiding in determining the depth that a fishing plug which is attached by a line is running while trolling from a moving boat, said apparatus including:
   a. a housing;
   b. means for mounting said housing on an end of said fishing rod;
   c. a freely rotatable transverse shaft carried by said housing;
   d. a radially extending arm carried by said transverse shaft;
   e. an eyelet carried on one end of said radially extending arm through which said line extends for causing said radially extending arm to assume the same angle to a horizontal plane as said line;
   f. a weighted, pivotal member carried by said housing, a calibrated scale carried on said pivotal member that is maintained in substantially the same position regardless of the angular position of said rod, and
   g. a pointer movable by said radially extending arm adjacent said calibrated scale for indicating the angular position of said line relative to a horizontal plane;
   whereby the depth that said plug is running behind said boat can be determined from the angular reading indicated by said pointer for a known length of line.

2. The apparatus as set forth in claim 1 wherein said weighted pivotal member includes a cylinder,
   a horizontal post carried by said housing for rotatably supporting said cylinder,
   said calibrated scale being carried on the perimeter of said cylinder, and
   said cylinder being weighted so as to present said calibrated scale in the same vertical plane regardless of the angular position of said rod.

3. The apparatus as set forth in claim 1 further comprising:
   means mounted on said rod for measuring the length of said line between said rod and said plug.

4. An apparatus for being mounted on an end of a fishing rod for producing a reading that can be utilized for determining the depth that a plug attached by a line is running while trolling from a moving boat, said apparatus including:
a. a housing;
b. means for attaching said housing to an end of said rod;
c. a calibrated scale carried on said housing representing angular readings that said line is extending downwardly from a horizontal plane;
d. an arm pivotally carried by said housing;
e. an eyelet carried by one end of said arm through which said line extends for causing said arm to assume the same angle to a horizontal plane as said line;
f. a pointer carried by said arm adjacent said calibrated scale for indicating the angular position of said line relative to said horizontal plane;

whereby the depth that said plug is running behind said boat can be determined from the angular reading indicated by said pointer for a known length of line.

5. The apparatus as set forth in claim 4 further comprising spring biased clips carried on said housing for securing said apparatus to said rod.

* * * * *